United States Patent
Kabatzke et al.

(10) Patent No.: US 8,779,611 B2
(45) Date of Patent: Jul. 15, 2014

(54) METHOD FOR OPERATING A PITCH-CONTROLLED WIND TURBINE

(75) Inventors: Wolfgang Kabatzke, Geesthacht (DE); Hermann Rochholz, Bozen (IT); Jochen Birkemeyer, Norderstedt (DE)

(73) Assignee: Nordex Energy GmbH, Hamburg (DE)

( * ) Notice: Subject to any disclaimer, the term of this patent is extended or adjusted under 35 U.S.C. 154(b) by 286 days.

(21) Appl. No.: 13/315,756

(22) Filed: Dec. 9, 2011

(65) Prior Publication Data
US 2012/0148402 A1  Jun. 14, 2012

(30) Foreign Application Priority Data
Dec. 10, 2010  (DE) .......................... 10 2010 054 014

(51) Int. Cl.
 *F03D 9/00* (2006.01)
(52) U.S. Cl.
 USPC ........................................................ 290/44
(58) Field of Classification Search
 USPC ............................................................ 290/44
 See application file for complete search history.

(56) References Cited

U.S. PATENT DOCUMENTS

| | | | | |
|---|---|---|---|---|
| 5,289,041 A | * | 2/1994 | Holley | 290/44 |
| 7,023,105 B2 | | 4/2006 | Wobben | |
| 7,317,260 B2 | * | 1/2008 | Wilson | 290/44 |
| 7,351,033 B2 | * | 4/2008 | McNerney | 416/1 |
| 7,420,289 B2 | | 9/2008 | Wang et al. | |
| 7,425,774 B2 | * | 9/2008 | Shibata et al. | 290/55 |
| 8,096,761 B2 | | 1/2012 | Fric et al. | |
| 8,217,524 B2 | * | 7/2012 | Nakashima et al. | 290/44 |
| 2008/0112807 A1 | | 5/2008 | Uphues et al. | |
| 2010/0140938 A1 | | 6/2010 | Cook | |
| 2010/0320761 A1 | | 12/2010 | Schwarze et al. | |
| 2011/0089693 A1 | * | 4/2011 | Nasiri | 290/44 |
| 2012/0078518 A1 | * | 3/2012 | Krishna | 702/3 |
| 2013/0214535 A1 | * | 8/2013 | Brath | 290/44 |

OTHER PUBLICATIONS

Van Der Hooft, E.L., et al, "Wind turbine control algorithms", DOWEC-F1W1-EH-03-094/0, XP003008410, ECN-C-03-111, Dec. 2003, pp. 1 to 89.

\* cited by examiner

*Primary Examiner* — Michael Zarroli
(74) *Attorney, Agent, or Firm* — Walter Ottesen P.A.

(57) ABSTRACT

Method for operating a pitch-controlled wind turbine, in which a set-point value for the generator torque (M) is prescribed in dependence upon a rotational speed (n) of the generator or of the rotor. A transition point ($n_3$, $M_3$) is provided at which a transition from a partial-load operation to a nominal-load operation occurs. A control of the rotational speed takes place by adjusting the blade pitch angle for a set-point value ($M_3$) from the transition point. The values ($n_3$, $M_3$) of the transition point are determined in dependence upon a current value of the air density. With falling air density, the rotational speed ($n_3$) is increased and/or the set-point value for the generator torque ($M_3$) is reduced.

8 Claims, 4 Drawing Sheets

METHOD FOR OPERATING A PITCH-CONTROLLED WIND TURBINE

CROSS REFERENCE TO RELATED APPLICATION

This application claims priority of German patent application no. 10 2010 054 014.5, filed Dec. 10, 2010, the entire content of which is incorporated herein by reference.

FIELD OF THE INVENTION

The present invention relates to a method for operating a pitch-controlled wind turbine in which a set-point value for the generator torque M is prescribed on the basis of a rotational speed n of the generator or rotor. The allocation rule for the set-point value M on the basis of the rotational speed n has a transition point at which a transition from a partial-load operation to a nominal-load operation occurs. In the nominal-load operation, the rotational speed $n_3$ is controlled for a set-point value $M_3$ from the transition point by adjusting the blade pitch angle.

BACKGROUND OF THE INVENTION

From U.S. Pat. No. 7,023,105 a method for controlling a wind turbine having an electric generator using air density data at the location of the wind turbine is known. In the method the generator of the wind turbine is controlled via a control unit which processes the air density data, and performance data for the generator are adjusted on the basis of the air density. In the known method, the elevation of the site of the wind turbine above sea level is taken into account, whereby the lower air density is taken into account in the power curve. Thus, the power to be generated by the wind turbine, which power is associated with a rotor rotational speed and thus with a particular tip speed ratio, can be adapted correspondingly, that is to say reduced, so that the generator torque does not exceed the torque provided by means of the generator as a result of exciting power supplied by the control unit. Overall, the aim is to maintain the efficiency determined via the power curve and to obtain the maximum amount of energy from the wind.

From U.S. Pat. No. 7,420,289 a method for calculating a power curve for high altitude sites is known. Therein, a relationship between the power coefficient $C_p$ and the tip speed ratio $\lambda$ is taken as a basis for determining a ratio between the electric output power P and the wind speed v.

From United States patent application publication 2008/0112807 a wind turbine is known in which the output power is reduced when the temperature of the ambient air drops below a predetermined threshold value. The reason for the power reduction is that at temperatures below −20° C. the operation of the wind turbine can require different load calculations.

In relation to the effects of the air density on the yield of the wind turbine, it should be borne in mind that in pitch-controlled wind turbines, a change in the air conditions can lead to aerodynamic stall effects with undesirable flow separation.

SUMMARY OF THE INVENTION

It is an object of the invention to provide an improved method for operating a pitch-controlled wind turbine wherein the falling air density is considered when prescribing the set-point value for the generator torque and at the same time undesirable stall effects on the rotor blade are avoided.

The method of the invention is for operating a wind turbine having a pitch controlled rotor blade, a rotor and a generator. The method includes the steps of: prescribing a set-point value for the generator torque M in dependence upon a rotational speed n of the generator or of the rotor; providing a transition point ($n_3$, $M_3$) whereat a transition occurs from a partial-load operation into a nominal-load operation; determining the values ($n_3$, $M_3$) of the transition point in dependence upon a current value of the air density $\rho$; with falling air density, increasing the rotational speed $n_3$ and/or reducing the set-point value $M_3$ for the generator torque; and, controlling the rotational speed n by adjusting the pitch angle of the rotor blade at the set-point value $M_3$ from the transition point ($n_3$, $M_3$).

The method according to the invention involves the operation of a pitch-controlled wind turbine in which an actual value of a rotational speed n of the generator or of the rotor is allocated a set-point value for the generator torque M. Generally, for the operation of the wind turbine, a distinction needs to be drawn between a partial-load operation and a nominal-load operation. In the partial-load operation, the set-point value for the generator torque is increased as rotational speed increases. In the nominal-load operation, the rotational speed $n_3$ is controlled by adjusting the blade pitch angle at a set-point value $M_3$.

The transition from the partial-load operation to the nominal-load operation occurs at a transition point which is defined by a value for the rotational speed $n_3$ and a set-point value for the generator torque $M_3$. According to the invention, the values of the transition point are determined on the basis of the current value of the air density and, with falling air density, cause the rotational speed $n_3$ to be increased and/or the set-point value for the generator torque $M_3$ to be reduced. This makes it possible to ensure that, with falling air density, the wind turbine can continue to operate efficiently and without problems with stable control at higher rotational speed and lower generator torque. In the method according to the invention, the nominal-load operation is then effected at the reduced generator torque $M_3$ from the transition point. By adapting the rotational speed $n_3$ at which the nominal-load operation is first effected and by adapting the set-point value for the generator torque $M_3$, undesirable aerodynamic stall effects can be avoided.

In order to better avoid undesirable stall effects on the rotor blade, the blade pitch angle is preferably already adjusted to a minimum blade pitch angle in the partial-load operation. The rotor blade then changes to the nominal-load operation prescribed by the air density at a minimum blade pitch angle.

In the preferred embodiment, the transition from partial-load operation to nominal-load operation for the wind turbine is varied on the basis of the air density. At the same time, the rotor blade is pre-pitched in the partial-load operation, so that upon entering the nominal-load operation the rotor blade does not receive the maximum possible power from the wind.

In a preferred improvement of the method according to the invention, the value of the minimum blade pitch angle is also chosen on the basis of the air density. In this manner it is possible to determine the minimum blade pitch angle at which the rotor blade enters the nominal-load operation.

In a further preferred embodiment the current air density $\rho$ is determined on the basis of the measured air temperature T and an air pressure p taking into account a value for the humidity $\psi$. The relative humidity can have a not insignificant effect on the air density, in particular when the wind turbines are set up at locations with high ambient temperature, where the air can hold a lot of moisture and on mountains or hills, where cloud formation, mist and the like can be expected.

In a preferred embodiment, the value for the humidity $\Psi$ is prescribed on the basis of a time of day and/or a season. Alternatively it is also possible to measure the humidity at the wind turbine.

In a preferred embodiment, a predetermined inflection point ($n_2$, $M_2$) is provided when the set-point value for the generator torque is allocated on the basis of the rotational speed. Starting from said inflection point, the set-point value for the generator torque increases linearly up to the nominal-load operation. This predetermined inflection point typically marks the transition from a range in which an optimum input of the set-point value for the torque takes place in dependence upon the rotational speed and the power coefficient of the rotor blade to a range in which there is a rapid increase in the set-point value for the generator torque as rotational speed increases.

In a preferred embodiment, the set-point value $M_2$ for the generator torque is reduced given constant rotational speed $n_2$ as air density falls. This approach is based on the consideration that the ideal power draw with the rotor is proportional to the air density, so that, as air density falls, it is possible for the optimum power drawn with the rotor blade to be lower. Therefore, for the inflection point ($n_2$, $M_2$), the transition to the linear increase as air density falls is also shifted toward lower set-point values for the generator torque.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
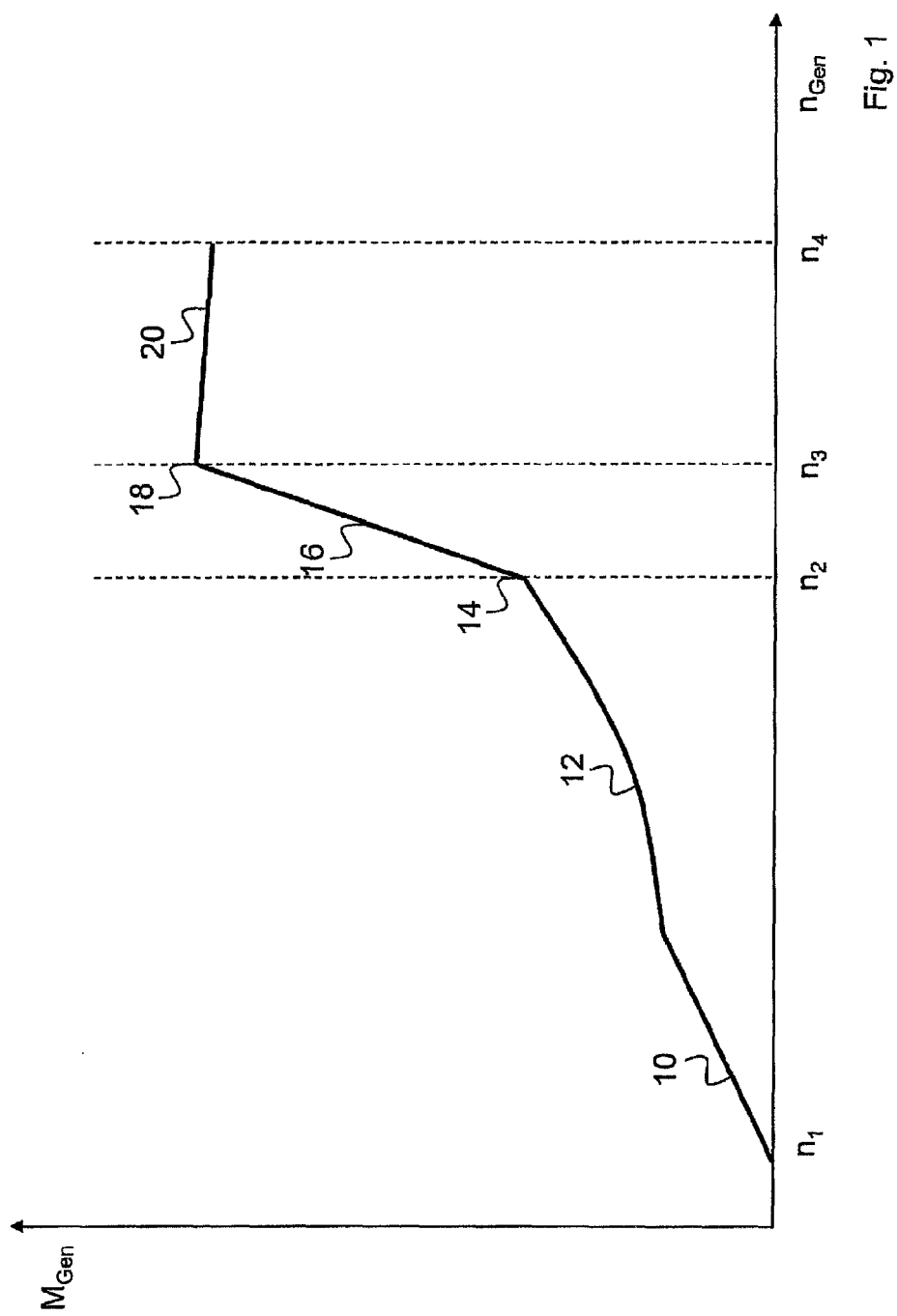
FIG. 1 shows the characteristic curve for the set-point value of the generator torque on the basis of the generator rotational speed.

FIG. 1 shows, as an example, the course of a characteristic curve which shows the set-point value of the generator torque $M_{Gen}$ as a function of the generator rotational speed $n_{Gen}$. The characteristic curve distinguishes four segments. In a first segment 10, the set-point value for the generator torque $M_{Gen}$ rises linearly as generator rotational speed $n_{Gen}$ increases.

In a second segment 12, the characteristic curve follows the ideal characteristic curve of the rotor. The set-point value for the generator torque is calculated using a function for the optimum power $P_{opt}$, which is as follows:

$$P_{opt}(n) = \left(2*\pi*R*\frac{n}{i_G}*\frac{1}{60*\lambda_{opt}}\right)^3 *\pi*R^2*\frac{\rho}{2}*C_{opt}$$

wherein: R refers to the radius of the rotor, n to the generator rotational speed, $i_G$ to the gear ratio of the gear assembly, $\lambda_{opt}$ to the optimum tip speed ratio of the rotor blade, $\rho$ to the air density and $cp_{opt}$ to the optimum power coefficient. Along the segment 12 of the characteristic curve the set-point value for the generator torque is calculated analytically according to the above formula.

An inflection point is located at point 14 between the second segment 12 and a third segment 16 of the characteristic curve. In order to achieve an optimum energy yield, the segment 16 leaves the ideal characteristic curve 12 and increases the set-point value for the generator torque more intensely as the rotational speed of the generator increases. In the embodiment shown the characteristic curve segment 16 is shown as a linearly rising segment. Other non-linear forms of the rise between the inflection point 14 and a transition point 18 are also possible. At the transition point 18, the wind turbine changes to its nominal-load operation. In this range, the power of the wind turbine has to be held constant, the power P being proportional to the rotational speed and to the torque of the generator:

$$P=M*\omega$$

wherein: $\omega=2\pi n_{Gen}$ is the angular frequency of the generator.

Figure 2:
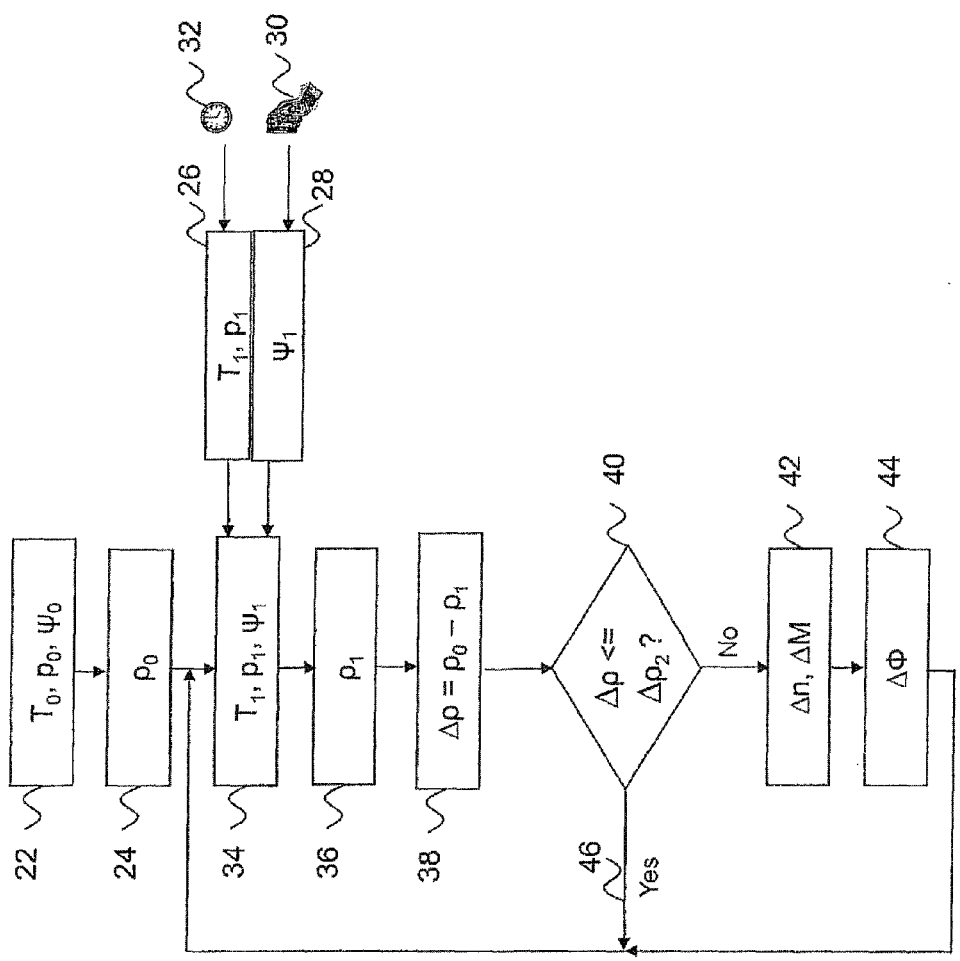
FIG. 2 shows a flowchart for calculating the change in rotational speed and the change in the set-point value for the generator torque on the basis of the air temperature, the air pressure and the humidity.

FIG. 2 uses a flowchart to describe how the rotational speed and the set-point value of the torque change at the transition point 18 as a function of the air density. For this, an air density $\rho_0$ at sea level is calculated in a method step 24 on the basis of the ambient temperature $T_0$, which indicates the air temperature of the surroundings at sea level, an air pressure $p_0$, which indicates the air pressure at sea level, and a value for the humidity $\psi_0$, which indicates the humidity at sea level. The calculation of the air density with the inclusion of the humidity is performed in an inherently known manner.

At the wind turbine, sensors measure the air temperature at operating point $T_1$ and the air pressure at operating point $p_1$ in step 26. A value for the humidity $\psi_1$ at the operating point is provided either by prescribing a parameter from a data source 30 or on the basis of a predetermined time function 32. A parameter for the humidity at operating point $\psi_1$ can, for example, be prescribed depending on the season or on the basis of the time of day.

The variables for air temperature, air pressure and humidity are present in method step 34 for the operating point of the wind turbine and are converted to an air density for the current operating point $\rho_1$ in step 36. The calculation of the air density in step 36 is performed in an inherently known manner just as in step 24.

In method step 38, a change in the air density $\Delta\rho$ is determined. The difference in the air density $\Delta\rho$ results from the air density for sea level $\rho_0$, calculated in step 24 and the air density for the current operating point $\rho_1$ calculated in step 36. In a subsequent method step 40, a check is performed to determine whether the change in the air density $\Delta\rho$ exceeds a maximum value for the change in the air density $\Delta\rho_2$. If the change in the air density $\Delta\rho$ determined in method step 40 exceeds the maximum allowable change in the air density $\Delta\rho_2$, a change in the generator rotational speed $\Delta n$ and a change in the generator torque $\Delta M$ are calculated in a subsequent step 42. The calculation in step 42 is performed as follows:

$$\Delta n = x\Delta n(n_2)+\Delta n_0$$

$$\Delta M = y\Delta M(n_2)+\Delta M_0,$$

wherein: x,y are parametrizable constants, $\Delta M(n_2)$ is the change in the set-point value for the generator torque at the rotational speed $n_2$ and $\Delta n_0$ and $\Delta M_0$ are system specific constants. In order to calculate $\Delta M(n_2)$, the rotational speed at the inflection point at which the characteristic curve changes from the second segment 12 to the steeply rising third segment 16 of the characteristic curve is chosen for $n_2$. The advantage of this definition for $\Delta M(n_2)$ is that the value can be analytically calculated as the end point of the second segment.

Aside from the determination of the variables of $\Delta n$ and $\Delta M$ in step 42, a variable $\Delta \Phi$ for the blade pitch angle is also calculated in step 44, the variable being dependent on the air density $\rho_1$ at the operating point which was determined in step 36.

If the inquiry in step 40 determines that the change in the air density $\Delta \rho$, calculated in method step 38, is less than the maximum allowable change in the air density $\Delta \rho_2$ or is the same as the maximum allowable change in the air density $\Delta \rho_2$, the method returns to method step 34 via the branch 46 in order to calculate a value for the air density at operating point $\rho_1$ again.

Figure 3:
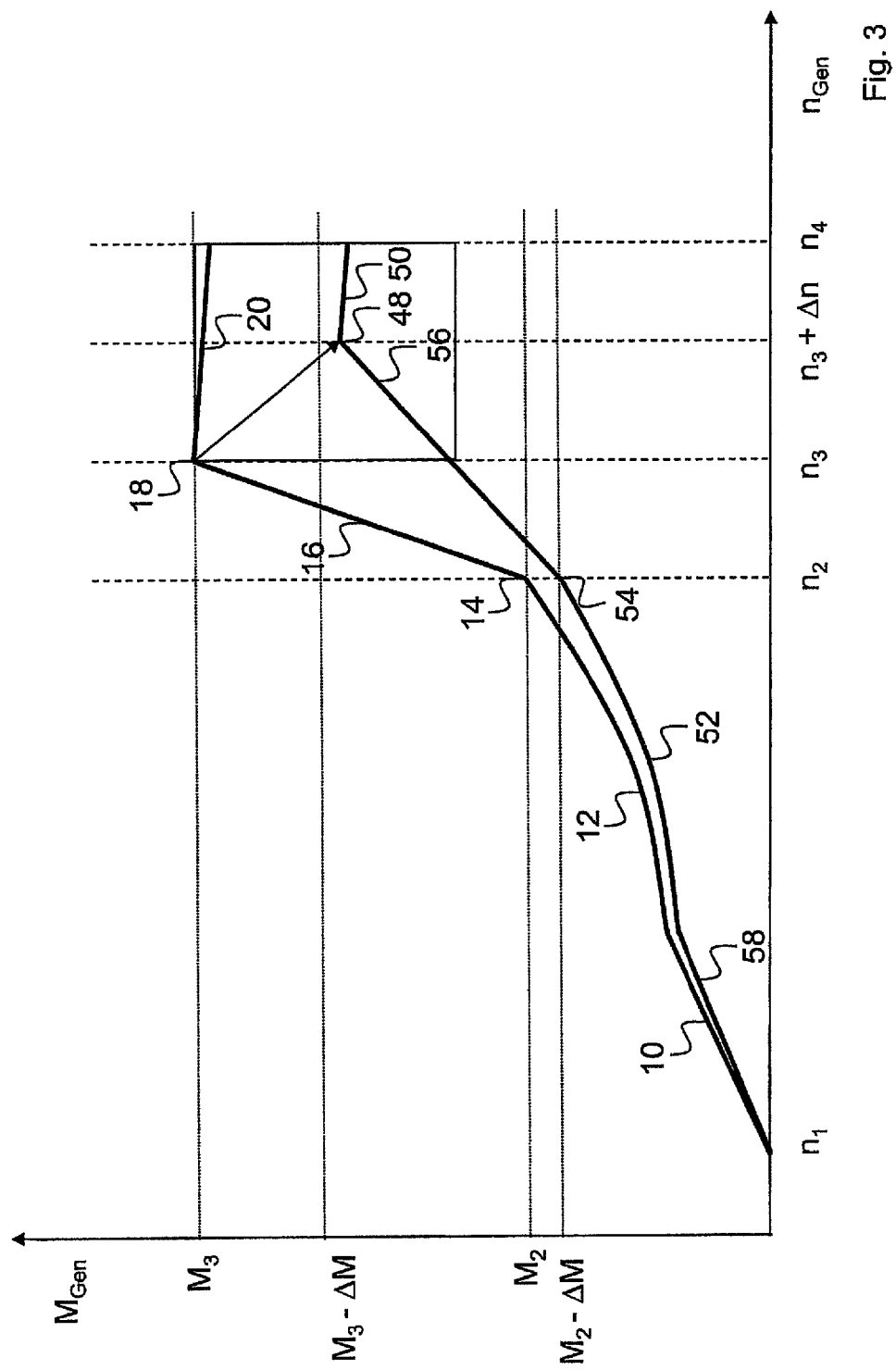
FIG. 3 shows the characteristic curve for the set-point value of the generator torque on the basis of the generator rotational speed with its shifted course for falling air density; and, FIG. 4 shows the course of the blade pitch angle as a function of the generator rotational speed.

FIG. 3 shows a change in the characteristic curve for falling air density. It can be clearly seen that the transition point 18 is shifted toward a new transition point 48. If one considers the method for correcting the characteristic curve, this can also be understood as an auto-corrected control function. The shift in the transition point means:

$$(n_3, M_3) \rightarrow (n_3 + \Delta n, M_3 - \Delta M),$$

wherein: $n_3$ and $M_3$ denote the transition point 18 of the non-shifted characteristic curve and $(n_3 + \Delta n)$ identifies the rotational speed of the shifted transition point and $(M_3 - \Delta M)$ identifies the set-point value of the generator torque of the shifted transition point.

An important aspect of the aforementioned shift in the transition point is that it does not only involve a reduction in the set-point value for the generator torque but at the same time there is also an increase in the rotational speed at which the wind turbine switches to the nominal-load operation. The segment of the characteristic curve which refers to the nominal-load operation at reduced air density is shown adjoining the transition point 48 as characteristic curve segment 50. As noted in FIG. 3, the change in the transition point 18 to the new transition point 48 is dependent on the temperature, the air pressure and the humidity.

As is further shown in FIG. 3, a maximum generator rotational speed $n_4$ can be defined for the generator according to the design. If the new rotational speed $(n_3 + \Delta n)$, which is obtained on the basis of the transition point 18, is greater than the maximum allowable value for the generator rotational speed $n_4$, then the rotational speed is not increased further; on the contrary, the rotational speed is increased only up to the maximum allowable generator rotational speed. In this example, the reduction in the set-point value of the generator torque by $\Delta M$ on the basis of the transition point 18 can also still be adapted. One possibility for the adaptation is provided by the boundary condition that:

$$(\Delta n)^2 + (\Delta M)^2 = \text{constant}.$$

This means that, on the basis of the transition point 18, the generator rotational speed for the new transition point 48 is increased only up to the maximum allowable generator rotational speed $n_4$. On the other hand, the set-point value for the generator torque is reduced while keeping constant the distance between the transition points 18 and 48 which is produced in the event of a non-limited increase in the rotational speed. The set-point value for the generator torque is in this case reduced along an imaginary circle whose center forms the transition point 18 and whose radius is determined as $\sqrt{(\Delta n)^2 + (\Delta M)^2}$.

With the shift in the transition point for the nominal operation for falling air density described above, the further characteristic curve segments change as well. The characteristic curve segment 12 is, as results directly from the formula above, proportional to the air density, so that overall the second characteristic curve segment 12 shifts toward smaller set-point values for the generator torque. The changed characteristic curve segment 52 also means that overall the inflection point 14 for leaving the second characteristic curve segment shifts toward smaller set-point values for the generator torque. The shifted inflection point 54 is characterized in that only the set-point value for the generator torque is reduced as a result of the characteristic curve segment 52, but not the value for the rotational speed. The shifted inflection point 54 and the shifted transition point 48 lead to a third characteristic curve segment 56 which is flatter than the third characteristic curve segment 16.

Also, the lowering of the second characteristic curve segment 12 for the first characteristic curve segment 10 in the method according to the invention results in a flatter course which is illustrated by characteristic curve segment 58.

Figure 4:
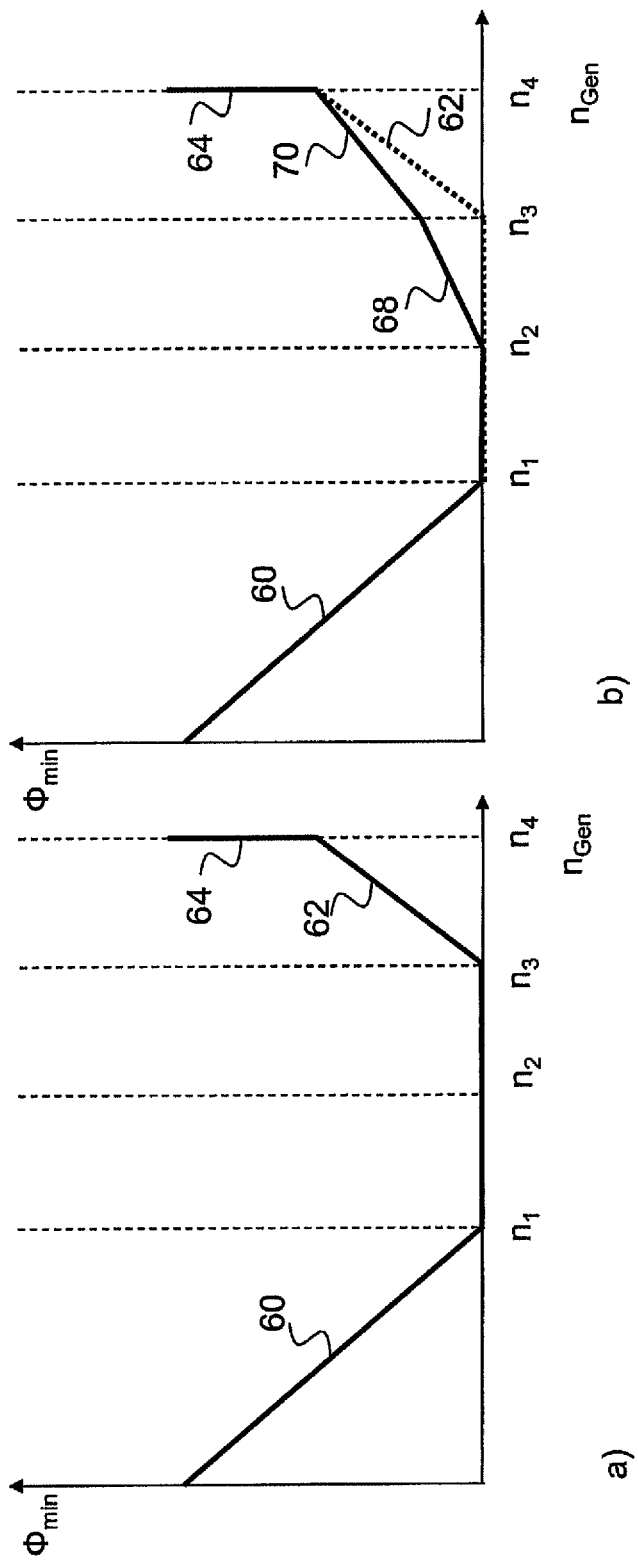

FIG. 4 shows the course of the minimum blade pitch angle as a function of the rotational speed. FIG. 4a shows the conventional operation of a wind turbine according to the prior art. For the wind turbine, the minimum blade pitch angle is limited up to a rotational speed of $n_1$ by the line 60 in a normal operation. Only after the transition to the nominal-load operation at rotational speed $n_3$ is the minimum blade pitch angle limited by the curve 62 which rises linearly.

In this case, the graph should be read to mean that the minimum allowable blade pitch angle is prescribed in dependence upon the generator rotational speed.

In the method according to the invention which is shown in FIG. 4b, a minimum allowable blade pitch angle is already prescribed from a rotational speed $n_2$ onward. Thus, a minimum blade pitch angle according to the curve segment 68 is prescribed even before a transition to the nominal-load operation at the rotational speed $n_3$. In the nominal-load operation, the minimum blade pitch angle according to the curve segment 70 is then prescribed, the minimum blade pitch angle according to curve segment 70 being greater than in the curve segment 62.

In the embodiment shown according to FIG. 4b, the minimum blade pitch angle is not adapted in dependence upon the air density for reduced noise operation, as a result of which the curve 62 is essentially unchanged.

It is understood that the foregoing description is that of the preferred embodiments of the invention and that various changes and modifications may be made thereto without departing from the spirit and scope of the invention as defined in the appended claims.

What is claimed is:

1. A method for operating a pitch-controlled wind turbine having a rotor blade, a rotor and a generator, the method comprising the steps of:
   prescribing a set-point value for the generator torque (M) in dependence upon a rotational speed (n) of the generator or of the rotor;
   providing a transition point $(n_3, M_3)$ whereat a transition occurs from a partial-load operation into a nominal-load operation wherein said rotational speed (n) is controlled by adjusting the pitch angle of said rotor blade;
   determining the values $(n_3, M_3)$ of said transition point in dependence upon a current value of the air density ($\rho$);
   with falling air density, increasing the rotational speed $(n_3)$ and/or reducing said set-point value $(M_3)$ for the generator torque;

determining a change ($\Delta\rho$) in said air density ($\rho$) and comparing said change ($\Delta\rho$) to a maximum allowable change ($\Delta\rho_2$) in air density; and, if said change ($\Delta\rho$) in air density ($\rho$) exceeds said maximum allowable change ($\Delta\rho_2$), then changing said transition point.

2. The method of claim 1, wherein the blade pitch angle is already adjusted to a minimum blade pitch angle in the partial-load operation.

3. The method of claim 2, wherein the value of the minimum blade pitch angle is selected in dependence upon the air density.

4. The method of claim 1, wherein the current air density ($\rho$) is determined in dependence upon a measured air temperature (T) and a measured air pressure (p) taking into account a value for the humidity ($\psi$).

5. The method of claim 1, wherein a value ($\Psi$) for humidity is provided in dependence upon a time of day and/or a season.

6. The method of claim 4, wherein said value for the humidity ($\psi$) is measured.

7. The method of claim 1, wherein a characteristic curve of generator torque ($M_{Gen}$) as a function of generator rotational speed ($n_{Gen}$) is provided and said characteristic curve has a predetermined point ($n_2$, $M_2$), starting from which the set-point value for the generator torque increases linearly up to a nominal-load operation.

8. The method of claim 7, wherein the set-point value ($M_2$) for the generator torque is reduced given constant rotational speed ($n_2$) with falling air density.

* * * * *

UNITED STATES PATENT AND TRADEMARK OFFICE
CERTIFICATE OF CORRECTION

PATENT NO. : 8,779,611 B2  
APPLICATION NO. : 13/315756  
DATED : July 15, 2014  
INVENTOR(S) : Wolfgang Kabatzke, Hermann Rochholz and Jochen Birkemeyer Page 1 of 1

It is certified that error appears in the above-identified patent and that said Letters Patent is hereby corrected as shown below:

In the Specification

In Column 3:

Line 60: delete "$P_{opt}(n) = \left(2*\pi*R*\frac{n}{i_G}*\frac{1}{60*\lambda_{opt}}\right)^3 *\pi*R^2*\frac{\rho}{2}*C_{opt}$"

and insert -- $P_{opt}(n) = \left(2*\pi*R*\frac{n}{i_G}*\frac{1}{60*\lambda_{opt}}\right)^3 *\pi*R^2*\frac{\rho}{2}*cp_{opt}$ -- therefor.

Signed and Sealed this  
Seventh Day of October, 2014

Michelle K. Lee  
*Deputy Director of the United States Patent and Trademark Office*